(12) United States Patent
Miller

(10) Patent No.: US 6,220,574 B1
(45) Date of Patent: Apr. 24, 2001

(54) WINCH HANDLE

(75) Inventor: Graham M. Miller, Dorchester (CA)

(73) Assignee: Copperweld Canada Inc., Woodstock (CA)

( * ) Notice: Subject to any disclaimer, the term of this patent is extended or adjusted under 35 U.S.C. 154(b) by 0 days.

(21) Appl. No.: 09/440,003

(22) Filed: Nov. 12, 1999

(30) Foreign Application Priority Data

Oct. 5, 1999 (CA) .................................................. 2284845

(51) Int. Cl.[7] ....................................................... B66D 1/00
(52) U.S. Cl. ........................ 254/323; 70/259; 224/42.23
(58) Field of Search ............................. 254/323; 70/259; 224/42.12, 42.2, 42.23, 42.24

(56) References Cited

U.S. PATENT DOCUMENTS

| | | | | |
|---|---|---|---|---|
| 2,433,921 | * | 1/1948 | Nelson ................................ | 254/323 |
| 3,539,152 | * | 11/1970 | Paul et al. ........................... | 254/323 |
| 3,865,264 | | 2/1975 | Kuhns . | |
| 4,526,021 | * | 7/1985 | Princell ............................... | 70/259 |
| 4,735,448 | * | 4/1988 | Hart .................................... | 254/323 |
| 4,915,358 | * | 4/1990 | Stallings ............................. | 254/323 |
| 4,988,023 | * | 1/1991 | Heathcoat ........................... | 70/259 |
| 5,060,912 | * | 10/1991 | Guarr .................................. | 254/323 |
| 5,077,995 | * | 1/1992 | Appelbaum ......................... | 70/259 |
| 5,330,313 | * | 7/1994 | Easterwood ...................... | 224/42.25 |
| 5,343,722 | * | 9/1994 | Richardson ......................... | 70/259 |
| 5,638,711 | * | 6/1997 | Schothoefer ..................... | 224/42.23 |
| 5,673,899 | * | 10/1997 | Stallings ............................. | 254/323 |
| 5,681,137 | * | 10/1997 | Stallings ............................. | 254/323 |
| 5,718,553 | * | 2/1998 | Via et al. ......................... | 224/42.23 |
| 5,758,523 | | 6/1998 | Kozlowski, Jr. et al. . | |
| 5,960,654 | * | 10/1999 | Stanalajczo ..................... | 224/42.23 |

* cited by examiner

*Primary Examiner*—Emmanuel M. Marcelo
(74) *Attorney, Agent, or Firm*—Simpson, Simpson & Snyder, L.L.P.

(57) ABSTRACT

A connector for automobile winches comprises a generally cylindrical body with a winch drive shaft receiving end and a crank receiving end. The drive shaft receiving end is provided with a pair of opposed openings through which a retaining pin, attached to the winch drive shaft is passed, thereby creating an universal joint. The crank receiving end is provided with an insert adapted to receive an end of the crank. The connector is designed to extend outside of the vehicle body and at an upward angle to facilitate operation of the winch. The invention also eliminates the need for carrying long cranks.

4 Claims, 6 Drawing Sheets

WINCH HANDLE

FIELD OF THE INVENTION

The present invention relates to a handle for winch assemblies for spare wheels of automotive vehicles.

BACKGROUND OF THE INVENTION

Many vehicles such as pick up trucks, etc., include a spare wheel that is stored under the vehicle frame. Such vehicles are provided with a winch mechanism to lower the spare wheel from the stored position or for raising the wheel into the stored position.

One of the problems associated with the winch mechanism lay in the need for the operator to crawl under the vehicle to raise or lower the spare wheel. One solution to this problem is taught in U.S. Pat. No. 3,865,264 (incorporated herein by reference) wherein the winch mechanism is mounted close to the outer body of the vehicle This arrangement, however, affects the aesthetics of the vehicle. In a more common solution, the winch mechanism is normally provided with a handle to assist the wheel lowering or raising operation.

However, the known winch assemblies have other associated problems. For example, some of the proposed winch assemblies involve complicated ratchet mechanisms which require maintenance to ensure proper operation and add considerably to the weight of the vehicle Another problem lies in positioning the winch handle. To assist this operation, some of the known winch assemblies include extendable handles which are held in place with springs and the like. This, again, results in mechanisms that are subject to failure.

Another winch assembly is taught in U.S. Pat. No. 5,758,523, which is herein incorporated by reference. In this reference, as illustrated in FIG. 1, an elongate crank is used to actuate a winch, which is mounted under the vehicle body. To assist the engagement between the winch and the crank, a conduit is provided to guide the crank into engagement with the winch. Although this assembly alleviates some of the problems of the other known devices, it requires that a long crank be always maintained in the event that the spare wheel is required. Also, as discussed below, the assembly taught by this reference requires the operator to bend to the level of the winch in order to turn the crank. This forces the operator to an uncomfortable position.

The present invention seeks to alleviate the problems associated with the prior art winch mechanisms.

SUMMARY OF THE INVENTION

In a preferred embodiment, the present invention provides a connector for a winch on an automobile wherein the winch includes a drive shaft, the connector generally comprising a cylinder having a first end for connecting with the drive shaft and a second end extending through the vehicle body adapted to receive a crank.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
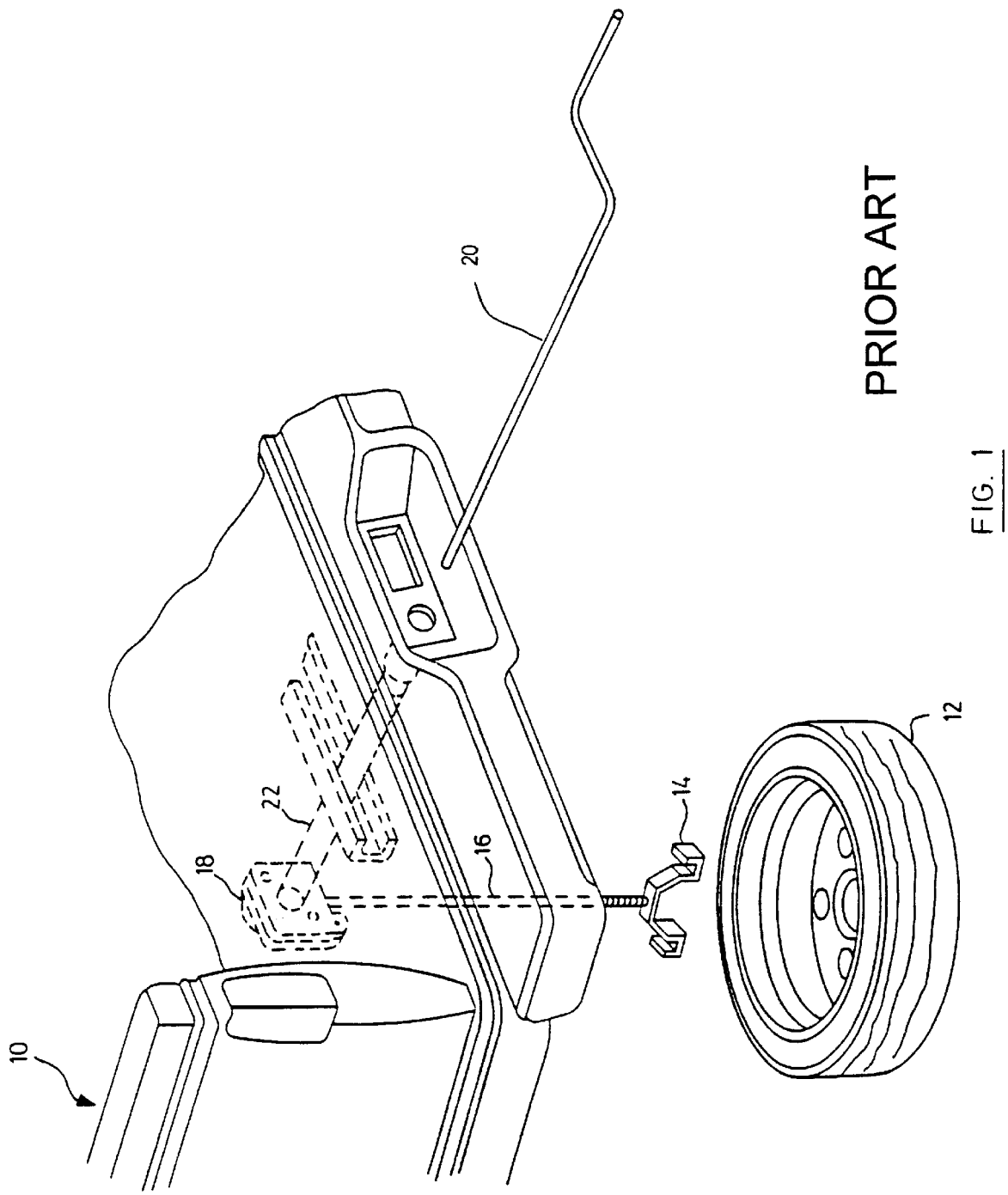
FIG. 1 is a perspective view of a rear end of a vehicle illustrating a prior art winch assembly.

As illustrated in FIG. 1, the prior art teaches vehicles 10 having a spare wheel 12, which is normally stored under the vehicle body. To store the wheel 12, it is first attached to a clamp 14, which, in turn, is attached to a free end of a cable 16. The cable is attached, at its opposite end, to a winch 18. A crank 20 is used to operate the winch 18. To accomplish this, the crank 20 is formed as an elongated rod so as to enable the operator to reach the winch 18 located under the vehicle body. A guide 22 is also provided to assist the operator in engaging the winch 18 with the elongate crank 20. Further detail of this mechanism is provided in U.S. Pat. No. 5,758,523, the content of which is incorporated herein by reference. As can be seen in FIG. 1, another problem with the prior art devices lies in the fact that, in order for the crank to cooperate with the winch, it must be positioned generally parallel to the ground. This positioning causes discomfort for the operator who must bend to the level of the crank to actuate the winch.

Figure 2:
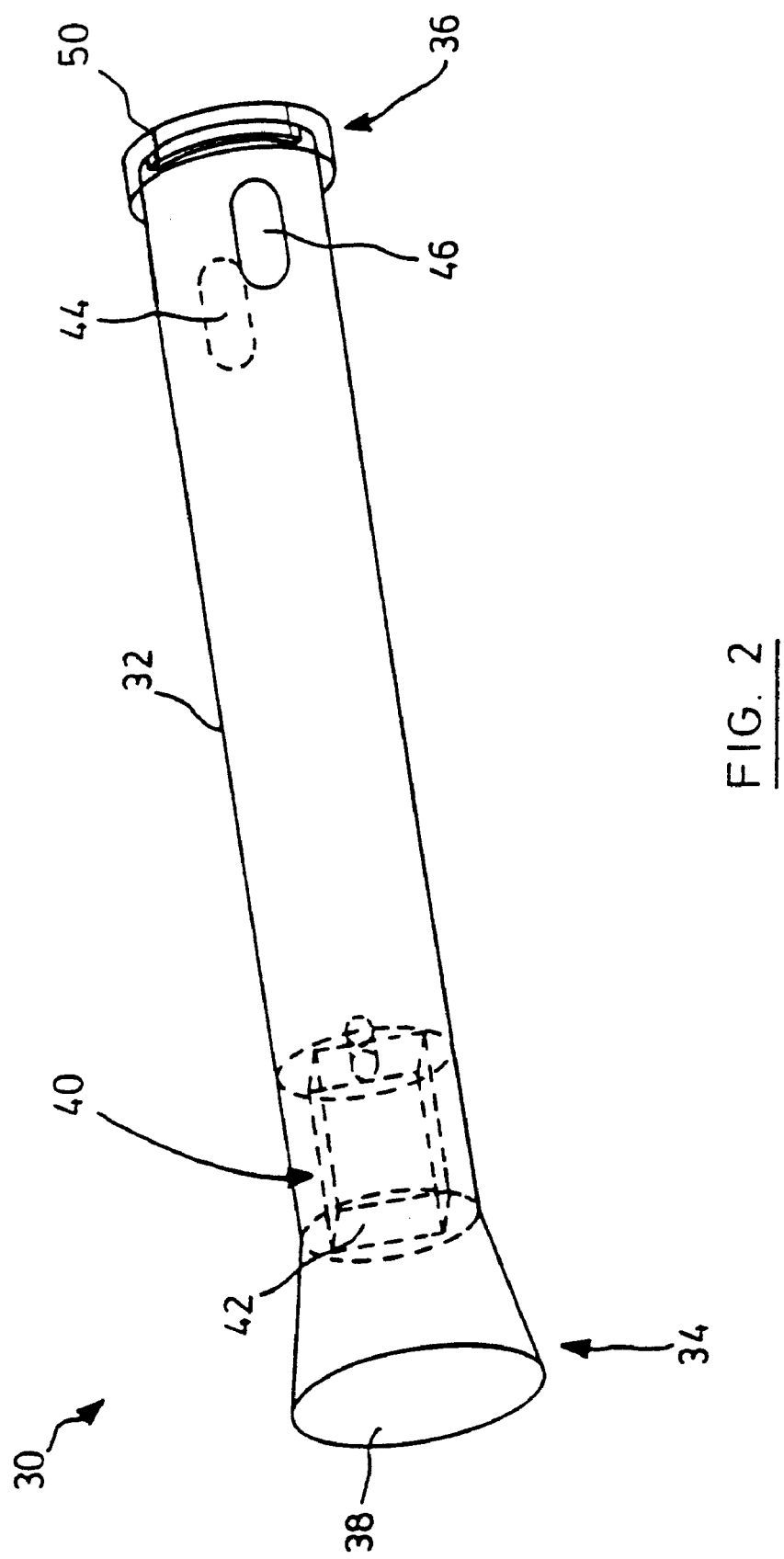
FIG. 2 is a perspective view of the winch handle of the invention.
Figure 3:
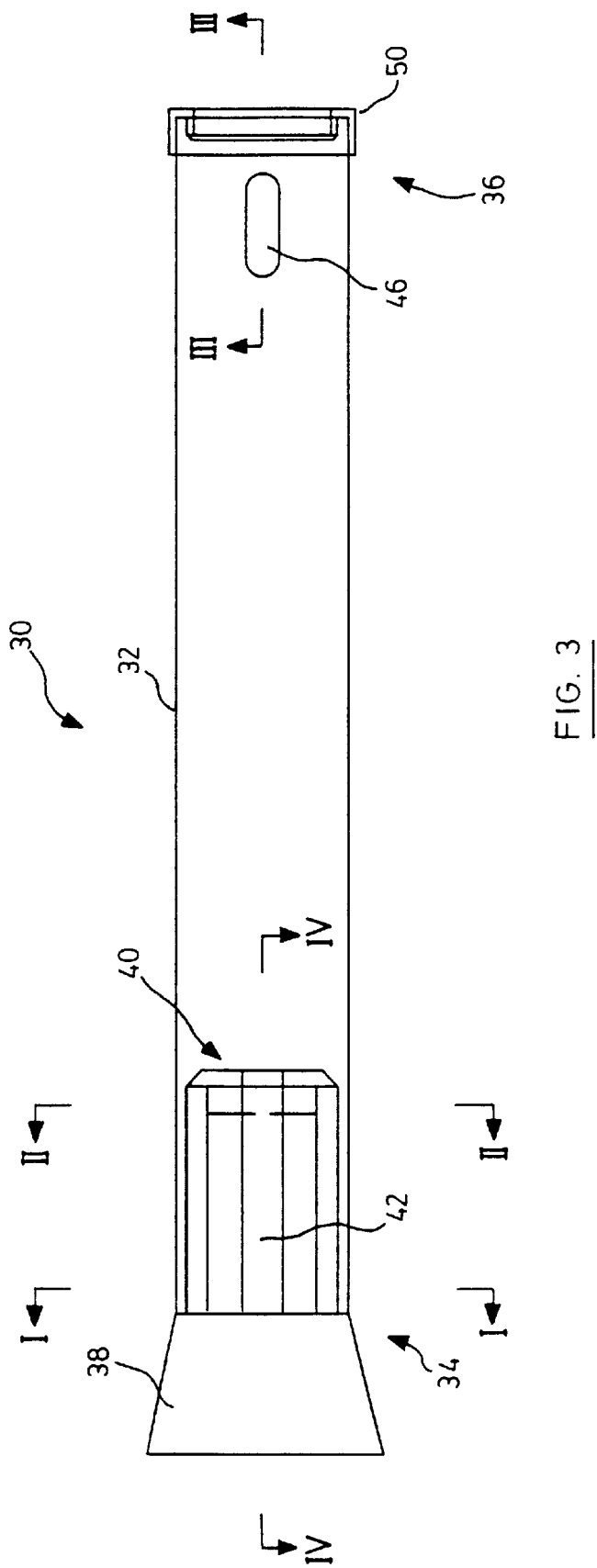
FIG. 3 is a side sectional view of the winch handle shown in FIG. 2.

As mentioned previously, the present invention provides a handle or connector for allowing rotational motion from a crank to be transferred to a winch, thereby eliminating the need for an elongated crank as in the prior art discussed above. FIGS. 2 and 3 illustrate one embodiment of the connector of the present invention. As shown, the connector, shown generally at 30, comprises a main shaft 32 having a crank receiving end 34 and a winch connecting end 36. The main shaft 32 generally comprises a hollow cylinder. The crank receiving end 34 is provided with a fluted portion 38 to facilitate location of the crank (not shown). Within the crank receiving end 34, an insert 40 is provided for engaging the crank. The insert includes a slot 42 into which the crank end is inserted. The winch connecting end 36 includes a pair of slots 44, 46 for engaging a pin on the winch. This arrangement is discussed further below. In the preferred embodiment, the insert 40 is press fit into the crank receiving end 34 of the connector 30. Preferably, the insert is fit within the connector so as to withstand a torque of 37 Nm. To assist these preferred requirements, the insert preferably is formed with 12 sides so as to provide longitudinal ridges for gripping the inner surface of the connector.

Figure 4:
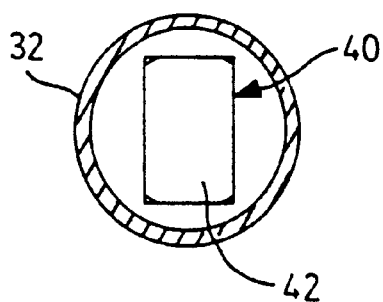
FIG. 4 is an end cross sectional view through section I—I of the winch handle of FIG. 3.

FIG. 4 illustrates a partial cross sectional end view of the insert 40 and the slot 42 wherein one end of a crank is inserted.

Figure 5:
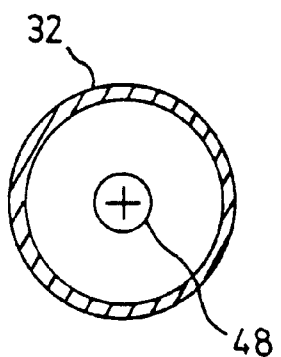
FIG. 5 is an end cross sectional view through section II—II of the winch handle of FIG. 3.

FIG. 5 illustrates another cross sectional view of the insert wherein a drain hole 48 is shown provided in the insert 40.

Figure 6:
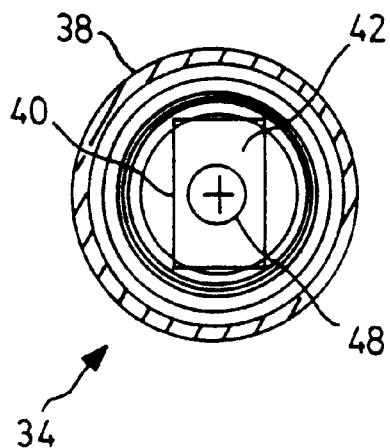
FIG. 6 is an end view of the winch handle of FIG. 3.
Figure 9:
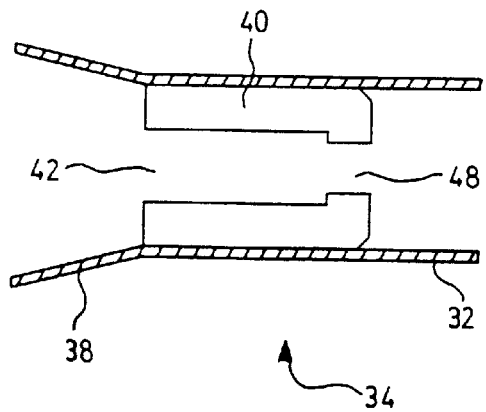
FIG. 9 is a partial side cross sectional view through section IV—IV of the winch handle of FIG. 3.

FIG. 6 is an end view of the crank receiving end 34 of the connector showing the insert 40, the slot 42 and the drain hole 48. Similarly, FIG. 9 is a longitudinal cross section of the end 34.

Figure 7:
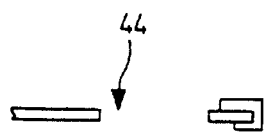
FIG. 7 is a partial side cross sectional view through section III—III of the winch handle of FIG. 3.
Figure 7:
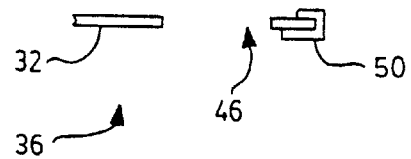
Figure 8:
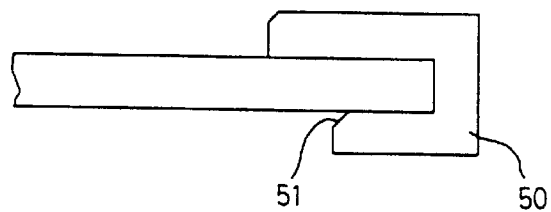
FIG. 8 is a detailed view of FIG. 7.

FIG. 7 shows an cross sectional view of the winch receiving end 36 of the connector. As shown, the winch receiving end is provided with a pair of opposing slots 44 and 46, which are described further below. The end 36 also is provided with a ring 50, which is fitted over the end of the connector 30. The ring 50 is shown in more detail in FIG. 8. The purpose of the ring 50 is also discussed further below. As shown in FIG. 8, the ring 50 is provided with a chamfered end 51 so as to facilitate fastening of the ring 50 to the connector.

Figure 10:
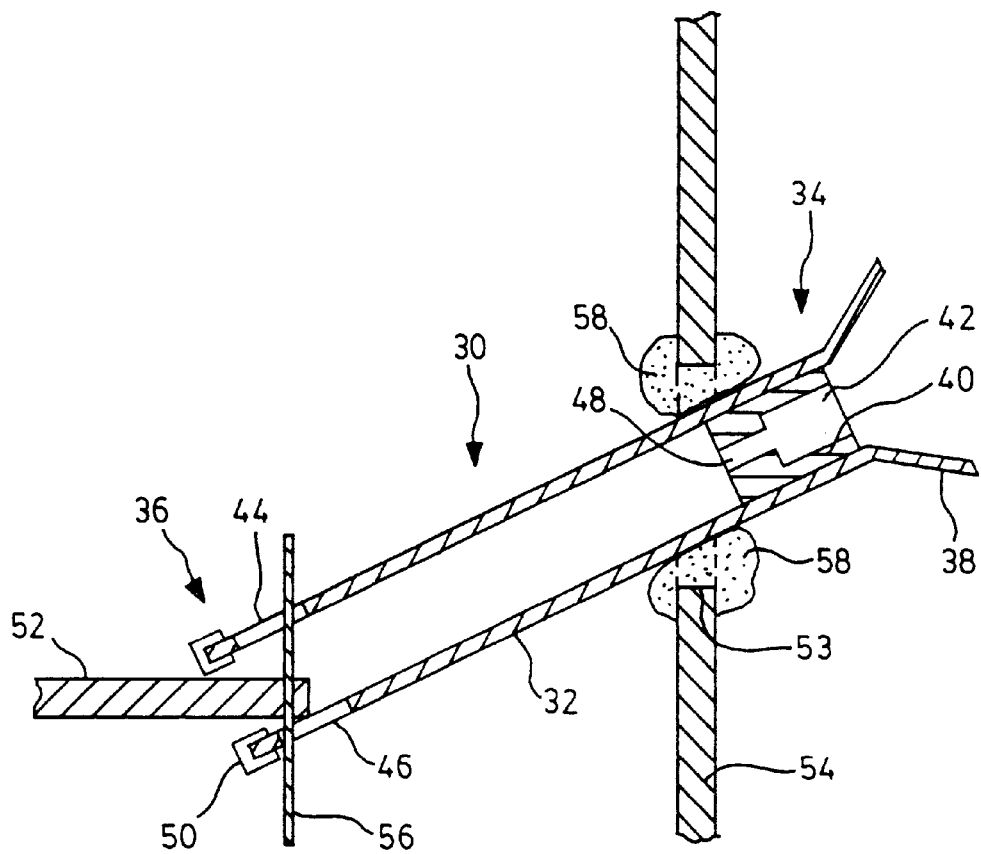
FIG. 10 is a cross-sectional view of a winch assembly according to a preferred embodiment of the present invention when in place in a vehicle.

FIG. 10 illustrates the connector 30 of the preferred embodiment when attached to the body of a vehicle. As shown, the connector 30 extends from a drive shaft 52 of the winch and through and opening 53 in the vehicle body 54. The connector 30 is attached to the winch drive shaft 52 by passing a retaining pin 56 through one of slots 44 or 46 on the winch receiving end 36 of the connector 30, through the drive shaft 52 and through the opposite slot on the end 36 The retaining pin 56 is attached to the winch drive shaft 52 so as to prevent the pin from being dislodged. As illustrated, the connector is positioned so that the crank receiving end 34 is preferably exposed so as to facilitate insertion of a crank. The connector 30 is preferably maintained in place by means of a rubber grommet 58, which permits rotation of the connector.

In operation, one end of a crank (not shown) is inserted into the slot 42. The crank is then rotated by means of the crank. Such rotational force is then transmitted by the connector to the winch drive shaft 52, which, in turn, actuates the winch to raise or lower the spare tire (not shown). The slots 44 and 46 are provided to act as a universal joint to result in rotation of the drive shaft. That is, at times when the retaining pin 56 is vertical, such as shown in FIG. 10, the length of the slots 44 and 46 allows the winch drive shaft to be driven on an angle. Therefore, such slots permit the connector 30 to be mounted at an upward angle as shown, thereby avoiding the necessity for the operator to bend during the operation of the winch.

Figure 11:
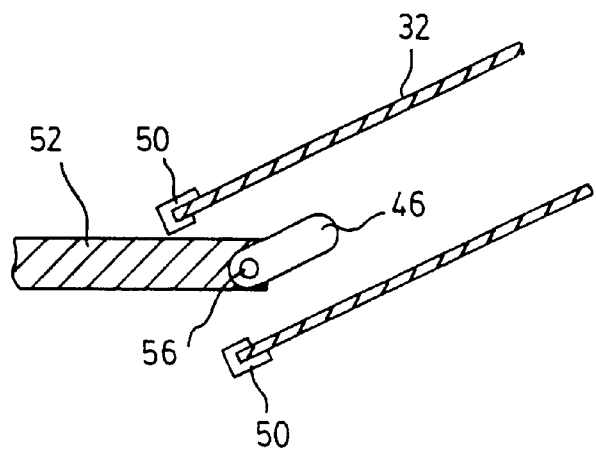
Figure 11 is a partial cross-sectional view of the winch assembly of FIG. 2 in another orientation.

FIG. 11 illustrates the connector of FIG. 10 after a 45° rotation. As shown, at this point, when the retaining pin 56 is horizontal, the retaining pin and the width of the slots 44 and 46 act as pivot points to rotate the drive shaft 52.

To further facilitate the rotation of the connector and drive shaft, the ring 50 is preferably made of a plastic material such as, for example, Santoprene™ brand plastic material. Such a material allows the connector end 36 to rotate without rattling. The ring 50 is preferably affixed to the connector with an adhesive.

Further, in the preferred embodiment, the connector is treated for inhibiting corrosion. The insert is also preferably made from copper infiltrated steel.

In the preferred embodiment, the connector 30 comprises a cylinder having a total length of 184.25 mm, a thickness of 1.5 mm and an outer diameter of 25.4 mm. Other dimensions of the preferred embodiment are as follows:

1) the insert 40 has a length of 34 mm and a diameter of 22.97 mm taken across its corners.
2) the slot 42 on the insert 40 has a width of 10.76 mm and a length of 28 mm.
3) the drain hole 48 of the insert 40 has a diameter of 6.3 mm.
4) the fluted end 38 of the connector has a length of 19.5 mm and is angled at 12° from the connector body 32.
5) the slots 44 and 46 of the connector have dimensions of 4.8 mm×16 mm (+/−0.25 mm)

The dimensions provided above are for comparison purposes only. As will be appreciated, other combinations of dimensions are also possible.

As will be appreciated, the present invention provides an easy means of using automobile winches. The invention overcomes some of the deficiencies in the prior art by allowing operation of the winch without the need for bending to the winch level and by eliminating the need for carrying a long crank for engaging the winch.

Although the invention has been described with reference to certain specific embodiments, various modifications thereof will be apparent to those skilled in the art without departing from the spirit and scope of the invention as outlined in the claims appended hereto.

What is claimed is:

1. A winch apparatus comprising a winch including a drive shaft, a connector generally comprising a cylinder having a first end, covered by a polymer ring, for connecting with said drive shaft and a second end adapted to receive a crank wherein rotation of said connector by said crank drives rotation of said drive shaft.

2. The apparatus of claim 1 wherein said connector first end includes a pair of opposed openings for receiving a retaining pin on said drive shaft.

3. The apparatus of claim 1 wherein said connector second end includes an insert for receiving the crank.

4. The apparatus of claim 3 wherein said connector further includes a flared portion at said second end for guiding the crank to said insert.

* * * * *